A voice activated camera is described which allows users to take remote photographs by speaking one or more keywords. In a preferred embodiment, a speech processing unit is provided which is arranged to detect extended periodic signals from a microphone of the camera. A control unit is also provided to control the taking of a photograph when such an extended periodic component is detected by the speech processing unit.

15 Claims, 6 Drawing Sheets

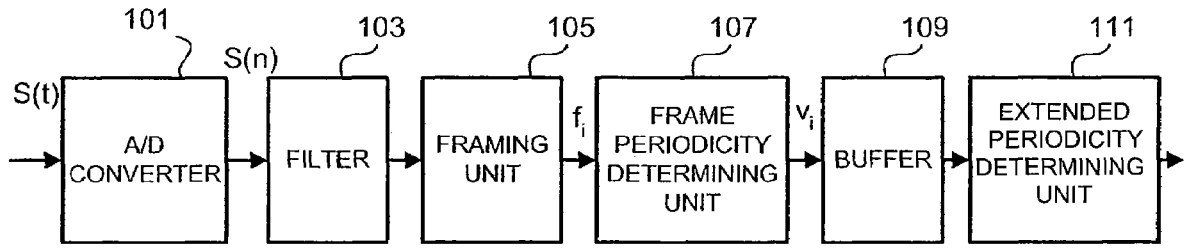

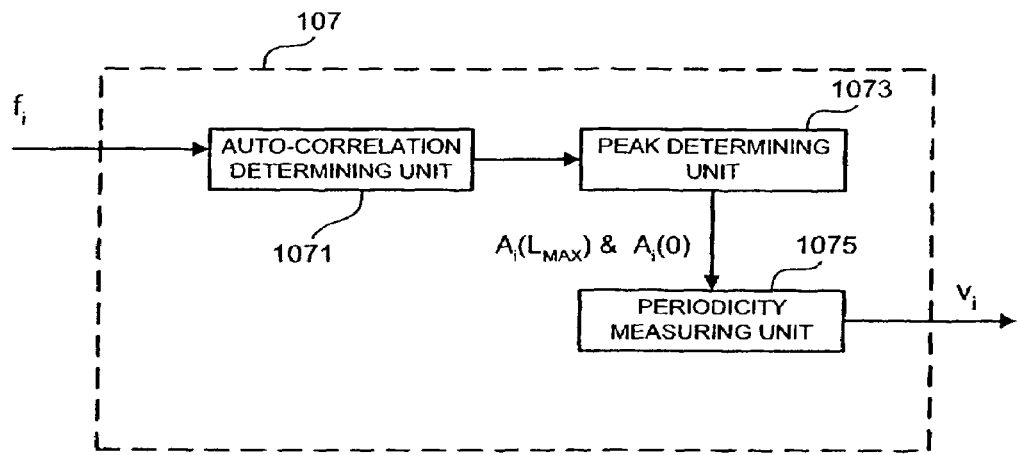
FIG. 5
FIG. 6
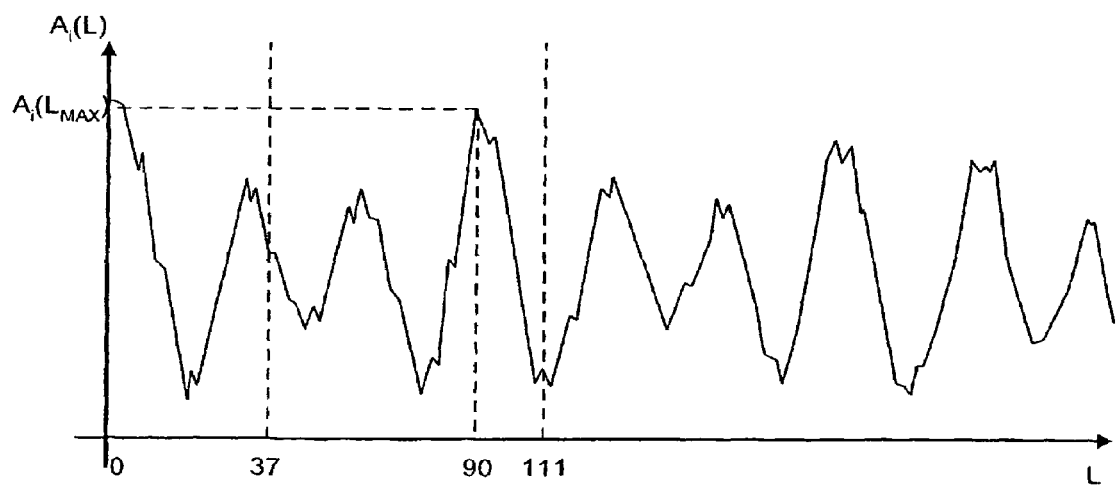

US 7,415,416 B2

VOICE ACTIVATED DEVICE

The present invention relates to an apparatus and method for controlling a remote device by voice. The invention can be used, for example, to control the remote taking of photographs or movies by a camera, camcorder or other image capture device.

To take a photograph with a camera, a user usually holds the camera, looks through a viewfinder situated on the back of the camera to frame the scene and then presses a button to cause a shutter in the camera to release, thereby exposing light onto photographic film or a light capturing electronic device. However, in situations wherein the user desires to be included in the photograph, e.g. group photographs, portrait photographs etc., the user will typically be some distance remote from the camera and cannot take a photograph in the usual manner. The term "remote photograph" will be used herein to describe the situation where the user desires to take a photograph without making physical contact with the camera In this situation, the user must have a way to activate the shutter without having to manually press a button on the camera.

It is known in the art to provide a timer on the camera in order to allow a remote photograph to be taken. With this camera, the user indicates that a remote photograph is to be taken by activating a specific switch on the camera and after a predetermined period of time a photograph is taken. However, this approach is inflexible and unsatisfactory for many scenarios since, if the timer period is too short, the photograph is taken before the user is ready, and if the timer period is too long, the user is left waiting for the camera to take the photograph. Further, if more than one remote photograph is to be taken, then the user must return to the camera each time in order to reset the timer period and then return to the desired location before the next photograph is taken.

It is also known in the art to provide a camera with a remote control. In this case, a remote photograph can be taken without reliance on a timer. However, the presence of the remote control adds to the overall cost of the camera. Further, the remote control is inconvenient since the user must carry it in addition to the camera in order to take remote photographs.

It is also known in the art to provide a camera with speech activated remote photograph taking, in which the camera is programmed to detect a specific spoken keyword using an automatic speech recognition unit. Such cameras have the advantage of not requiring a remote control whilst still allowing a photograph to be taken when the user is ready. However, these cameras may be unsuitable in fairly noisy situations where the keyword may not be detected due to corruption of the user's speech signal due to background noise and attenuation. Further, automatic speech recognition is computationally expensive and requires memory for storing the word models It is an aim of the present invention to provide an alternative technique of processing input speech signals to detect speech for controlling a device.

It is a further aim of the present invention to provide an alternative technique of allowing a user to activate a remote photograph function on an image capture device.

According to one aspect, the present invention provides an apparatus for controlling a device, the apparatus comprising: means for dividing a received speech signal into a sequence of speech frames; means for processing each speech frame to determine a measure of the periodicity of the speech within the speech frame; means for processing the periodicity measures from a plurality of successive speech frames to detect an extended periodic portion of speech and means for controlling the device in dependence upon the detection of said extended periodic portion.

According to another aspect, the present invention provides an image capture device comprising: means for receiving a speech signal; means adapted to detect an extended periodic portion within the received speech signal; and means for controlling the image capture device to capture an image in dependence upon a detection made by said detecting means.

According to another aspect, the present invention provides a method of controlling a device, the method comprising: receiving a speech signal; dividing the speech signal into a sequence of speech frames, each speech frame representing a time portion of the speech signal; processing each speech frame to determine a measure of periodicity of the portion of the speech signal represented by the speech frame; detecting an extended periodic portion within the received speech signal using the periodicity measures from a plurality of successive speech frames; and controlling said device in dependence upon a detection made by said detecting step.

Exemplary embodiments of the present invention will now be described with reference to the accompanying drawings in which:

FIG. 1 schematically illustrates a group of people having their photograph taken, a member of the group saying the word "cheeeese" and a camera located remote from the group taking the photograph;

FIG. 5 is a schematic block diagram illustrating the main components of a frame periodicity determining unit shown in FIG. 3;

FIG. 6 is a plot illustrating an output of an auto-correlation unit shown in FIG. 5 for a frame of speech;

OVERVIEW

Figure 1:
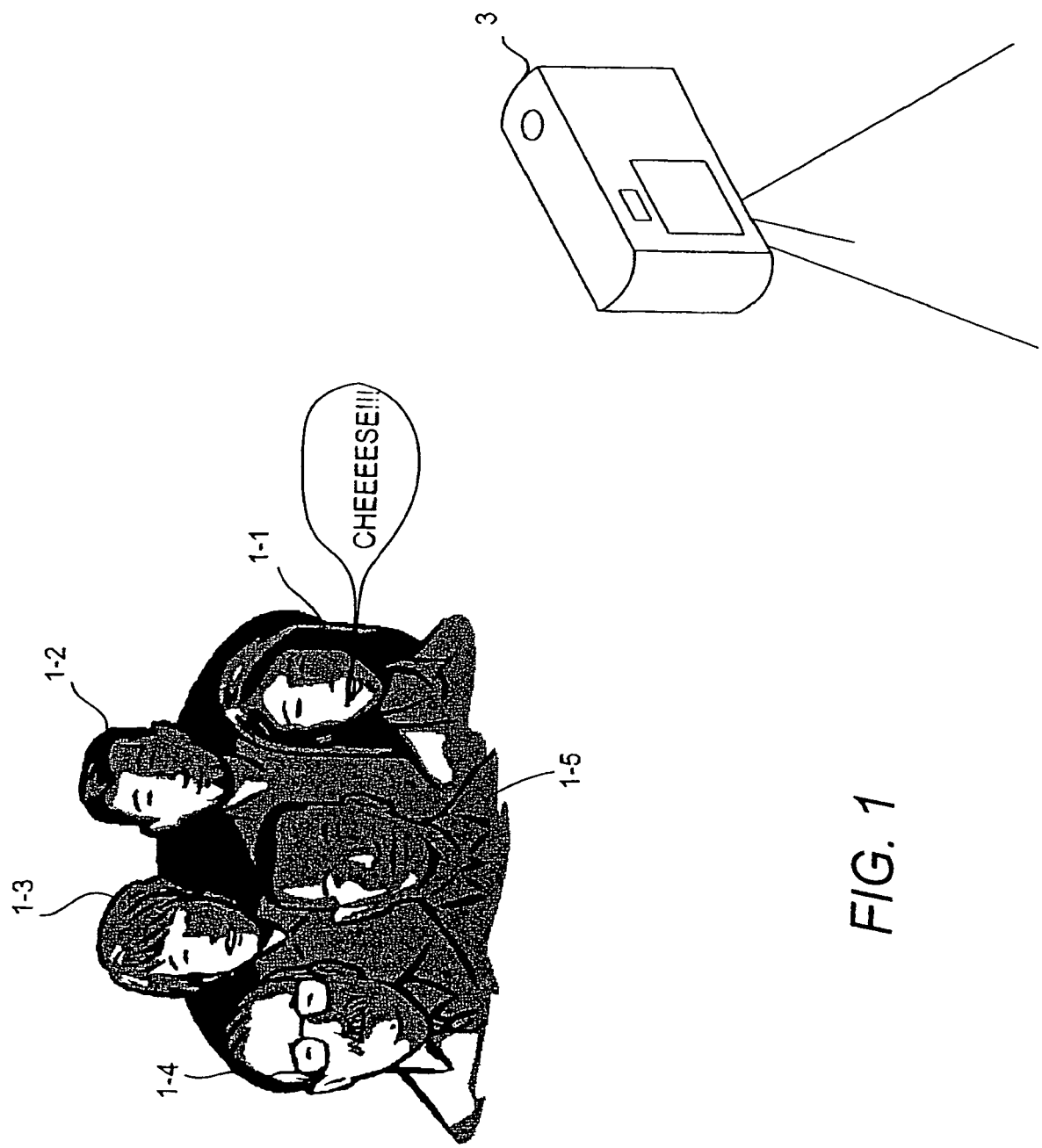

FIG. 1 shows a group of five people 1-1 to 1-5 who are posing for a photograph. When the group is ready for their photograph to be taken, one of them 1-1 says the word cheese with an extended vowel portion "eeee". In this embodiment, the camera 3 is operable to detect this extended vowel portion and, if detected, to take a photograph.

Figure 2:
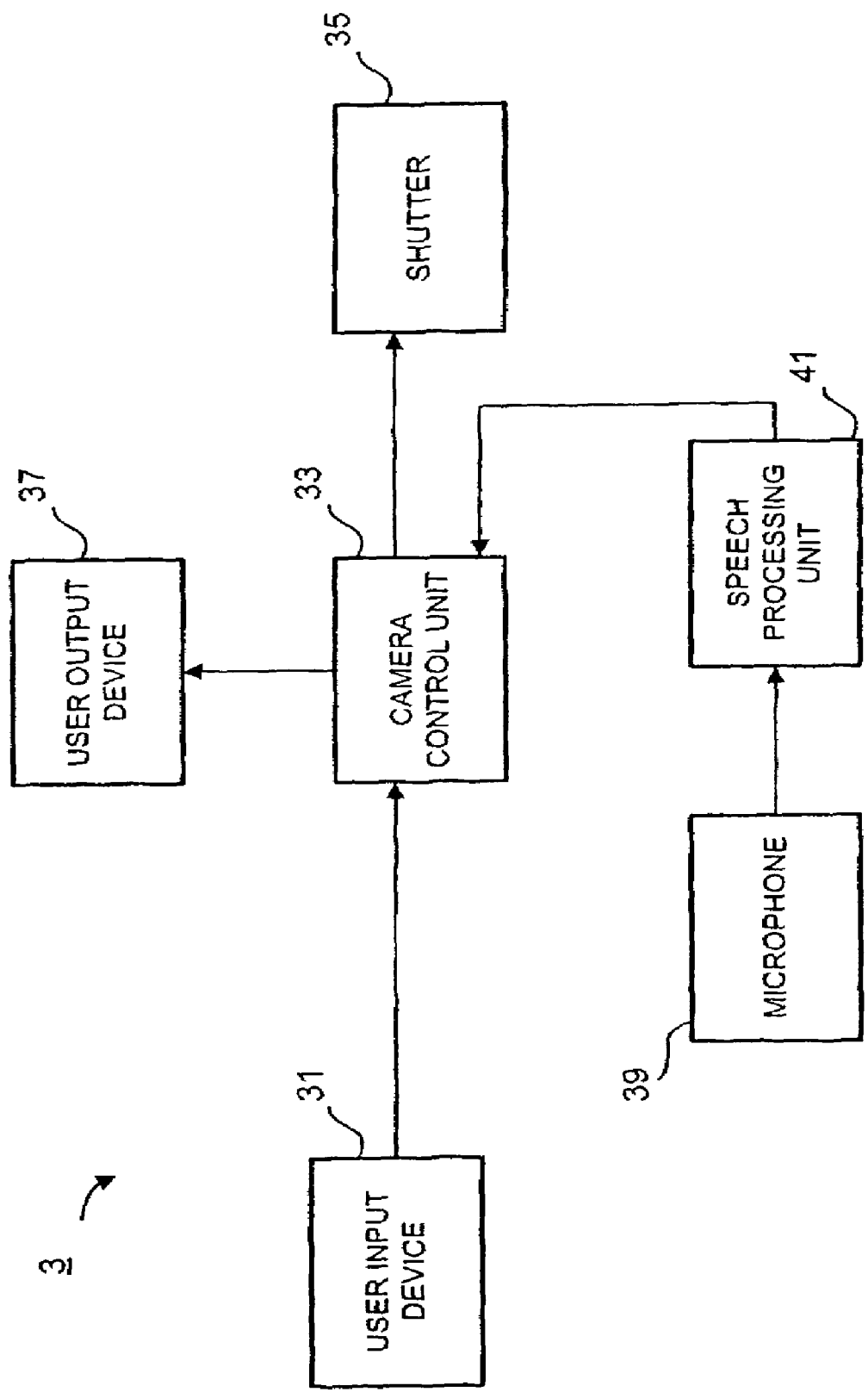
FIG. 2 is a schematic block diagram illustrating the main components of the camera shown in FIG. 1.

FIG. 2 is a schematic block diagram which shows the main components of the camera 3. In normal use, a user controls the camera 3 via a user input device 31 (such a button or dial). This user input is passed to a camera control unit 33 which controls the camera, for example to control a shutter 35 which allows light onto photographic film or a light sensitive electronic component such as a CCD or CMOS sensor (not shown). The camera control unit 33 also controls a user output device 37 (such as an LCD display or LED lights) in order to indicate camera and photograph status information (such as camera power, light intensity, flash mode etc.) to the user. As shown in FIG. 2, the camera 3 also includes a microphone 39 for converting a user's speech into corresponding electrical speech signals; and a speech processing unit 41 which processes the electrical speech signals to detect the presence of a keyword in the user's speech and which informs the camera control unit 33 accordingly.

Speech Processsing Unit

As discussed above, the speech processing unit 41 is arranged to detect keywords spoken by the user in order to control the taking of remote photographs. In this embodiment, the speech processing unit does not employ a "conventional" automatic speech recognition type keyword spotter which compares the spoken speech with stored models to identify the presence of one of the keywords. Instead, the speech processing unit 41 used in this embodiment is arranged to detect a sustained periodic signal within the input speech, such as would occur if the user gays the word "cheeeese" or some other similar word. The inventor has found that because of the strong periodic nature of such a sustained vowel sound, the speech processing unit 41 can still detect the sound even at very low signal-to-noise ratios.

The way in which the speech processing unit 41 operates in this embodiment will now be explained with reference to FIGS. 3 to 7.

Figure 3:
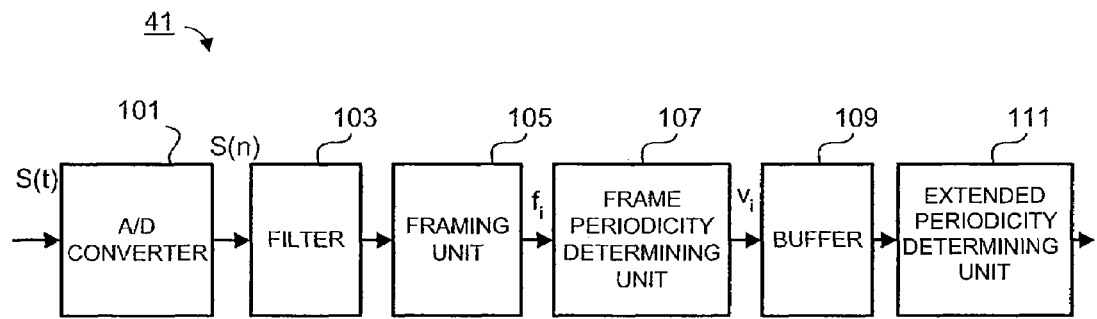
FIG. 3 is a schematic block diagram illustrating the main components of a speech processing unit shown in FIG. 2.
Figure 4:
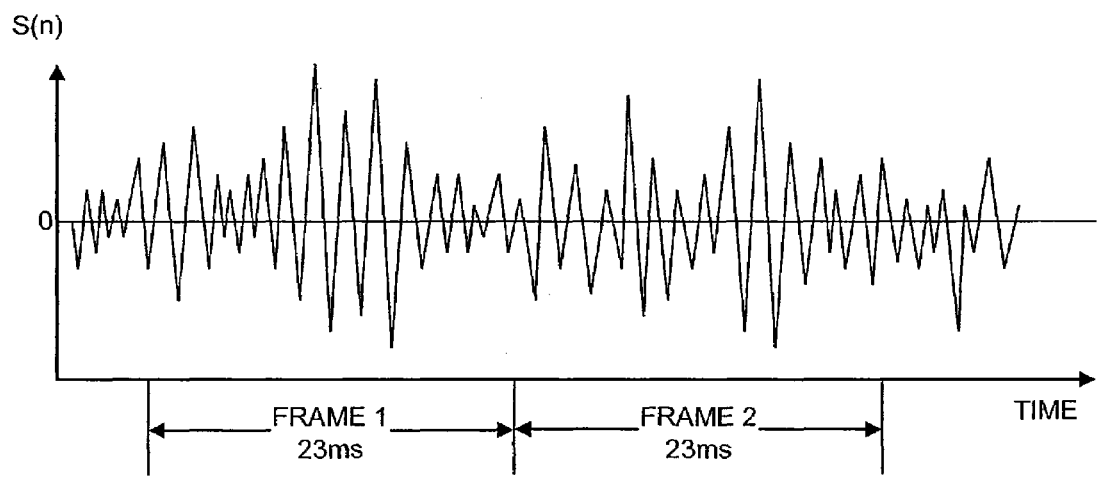
FIG. 4 is a plot of a typical speech waveform generated by a microphone of the camera, which illustrates the way in which the speech signal is divided into a number of non-overlapping frames.

FIG. 3 illustrates the main functional blocks of the speech processing unit 41 used in this embodiment. The input signal (S(t)) received from the microphone 39 is sampled (at a rate of just over 11 KHz) and digitised by an analogue-to-digital (A/D) converter 101. Although not shown, the speech processing unit 41 will also include an anti-aliasing filter before the A/D converter 101, to prevent aliasing effects occurring due to the sampling. The sampled signal is then filtered by a bandpass filter 103 which removes unwanted frequency components. Since voiced sounds (as opposed to fricative sounds) are generated by the vibration of the user's vocal cords, the smallest fundamental frequency (pitch) of the periodic signal to be detected will be approximately 100 Hertz Therefore, in this embodiment, the bandpass filter 103 is arranged to remove frequency components below 100 Hertz which will not contribute to the desired periodic signal. Also, the bandpass filter 103 is arranged to remove frequencies above 500 Hertz which reduces broadband noise from the signal and therefore improves the signal-to-noise ratio. The input speech is then divided into non-overlapping equal length frames of speech samples by a framing unit 105. In particular, in this embodiment the framing unit 105 extracts a frame of speech samples every 23 milliseconds. With the sampling rate used in this embodiment, this results in each frame having 256 speech samples. FIG. 4 illustrates the sampled speech signal (S(n), shown as a continuous signal for ease of illustration) and the way that the speech signal is divided into non-overlapping frames.

As shown in FIG. 3, each frame $f_1$ of speech samples is then processed by a frame periodicity determining unit 107 which processes the speech samples within the frame to calculate a measure ($v_i$) of the degree of periodicity of the speech within the frame. A high degree of periodicity within a frame is indicative of a voiced sound when the vocal cords are vibrating. A low degree of periodicity is indicative of noise or fricative sounds. The calculated periodicity measure ($v_i$) is then stored in a first-in-first-out buffer 109. In this embodiment, the buffer 109 can store frame periodicity measures for forty-four consecutive frames, corresponding to just over one second of speech. Each time a new frame periodicity measure is added to the buffer 109, an extended periodicity determining unit 111 processes all of the forty-four periodicity measures in the buffer 109 to determine whether or not a sustained periodic sound is present within the detection window represented by the forty-four frames.

When the extended periodicity determining unit 111 detects a sustained periodic sound within the speech signal, it passes a signal to the camera control unit 33 confirming the detection. As discussed above, the camera control unit 33 then controls the operation of the camera 3 to take the photograph at the appropriate time.

Frame Periodicity Determining Unit

As those skilled in the art will appreciate, various techniques can be used to determine a measure of the periodicity of the speech within each speech frame. However, the main components of the particular frame periodicity determining unit 107 used in this embodiment is shown in FIG. 5. As shown, the frame periodicity determining unit 107 includes an auto-correlation determining unit 1071 which receives the current speech frame $f_i$ from the framing unit 105 and which determines the auto-correlation of the speech samples within the frame. In particular, the auto-correlation determining unit 1071 calculates the following function:

$$A(L) = \frac{1}{N-L} \sum_{j=0}^{N-L-t} x(j)x(j+L) \tag{1}$$

where x(j) is the $j^{th}$ sample within the current frame, N is the number of samples in the frame, j=0 to N−1 and L=0 to N−1.

The value of A(L) for L=0 is equal to the signal energy and for L>0 it corresponds to shifting the signal by L samples and correlating it with the original signal. A periodic signal shows strong peaks in the auto-correlation function for values of L that are multiples of the pitch period. In contrast, non-periodic signals do not have strong peaks.

FIG. 6 shows the auto-correlation function ($A_i(L)$) for a frame of speech $f_i$ representing a speech signal which is periodic and which repeats approximately every 90 samples. As shown in FIG. 6, the auto-correlation around L=180. Further, the value of the auto-correlation function at L=90 is approximately the same as the value at L=0, indicating that the signal is strongly periodic.

The fundamental frequency or pitch of voiced speech signals varies between 100 and 300 Hertz. Therefore, a peak in the auto-correlation function is expected between $L_{low}=F_s/300$ and $L_{high}=F_s/100$, where $F_s$ is the sampling frequency of the input speech signal. Consequently, in this embodiment, the auto-correlation function output by the auto-correlation determining unit 1071 is input to a peak determining unit 1073 which processes the auto-correlation values between $A(L_{LOW})$ and $A(L_{HIGH})$ to identify the peak value ($A(L_{MAX})$) within this range. In this embodiment, with a sampling rate of just over 11 kHz the value of $L_{LOW}$ is 37 and the value of $L_{HIGH}$ is 111. This search range of the peak determining unit 1073 is illustrated in FIG. 6 by the vertical dashed lines, which also shows the peak occurring at $L_{MAX}=90$. The auto-correlation values A(0) and $A(L_{MAX})$ are then passed from the peak determining unit 1073 to a periodicity measuring unit 1075 which is arranged to generate a normalised frame periodicity measure for the current frame ($f_i$) by calculating:

$$v_i = \frac{A_i(L_{MAX})}{A_i(0)} \tag{2}$$

where $v_i$ will be approximately one for a periodic signal and close to zero for a non-periodic signal.

Extended Periodicity Determining Unit

The operation of the extended periodicity determining unit 111 will now be described in more detail with reference to FIG. 7, which shows a block diagram of the main components of the extended periodicity determining unit 111 used in this embodiment. As discussed above, the purpose of the extended periodicity determining unit 111 is to process the periodicity measures stored in the buffer 109 to detect a sustained voiced (i.e. periodic) signal with a minimum duration of one second. It does this by checking the variability of the periodicity measures currently stored within the buffer 109. In this embodiment, the extended periodicity determining unit 111 generates two different measures of this variability. In particular, in this embodiment, the extended periodicity determining unit 111 includes a first periodicity measure processing unit 111 which is operable to calculate the following variability measure from the periodicity measures ($v_i$) stored in the buffer 109:

$$m = \left| 1 - \frac{1}{W} \sum_{j=1}^{W} v_j \right| \quad (3)$$

where w is the number of periodicity measures in the buffer 109 (and is the value forty-four in this embodiment). The value of m should therefore be close to zero for a sustained periodic signal and should be close to one for a non-periodic signal.

The extended periodicity determining unit 111 also includes a second periodicity measure processing unit 1113 which also processes the periodicity measures stored is in the buffer 109 to generate the following second variability measure:

$$s = \sum_{j=1}^{W} \left| v_j - \frac{1}{W} \sum_{j=1}^{W} v_j \right| \quad (4)$$

Figure 7:
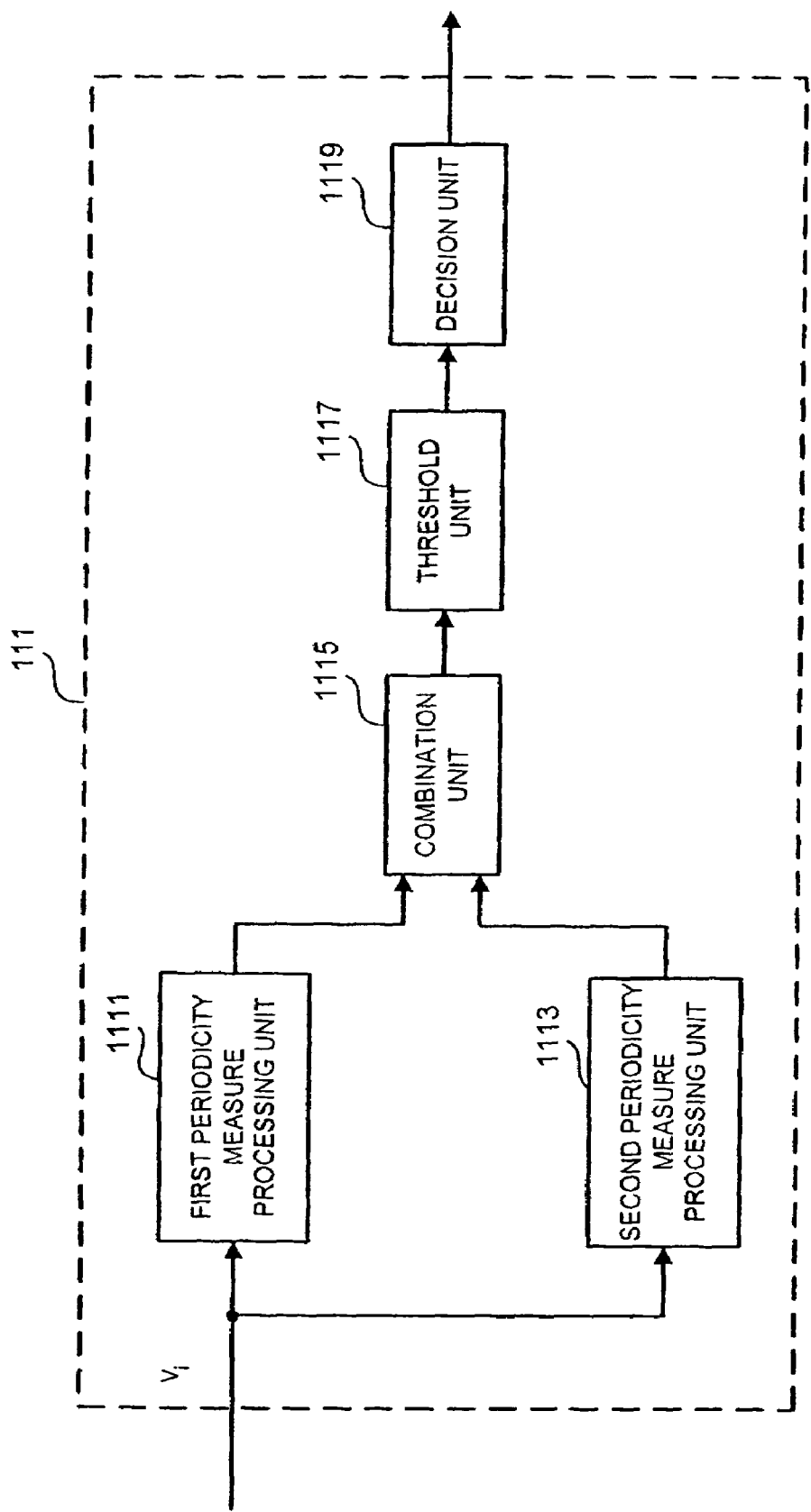
FIG. 7 is a schematic block diagram illustrating the main components of an extended periodicity determining unit shown in FIG. 3.

The value of a should also be small (close to zero) for a sustained periodic signal and should be larger for signals containing both periodic and a periodic portions As shown in FIG. 7, the above variability measures are then output by the respective processing units to a combination unit 1115 which, in this embodiment, linearly combines the two variability measures as follows:

$$Am+s \quad (5)$$

where A is an appropriate scale factor. The combined variability measure defined by equation (5) above is then compared with a predetermined threshold value (Th) in a threshold unit 1117 and, based on the comparison result, a decision is made by a decision unit 1119 as to whether or not the speech in the current detection window corresponds to an extended periodic signal In particular, if the speech signal does correspond to an extended periodic signal, then the value of Am+s should be less than the threshold, whereas if it does not, then Am+s should be greater than the threshold. As those skilled in the art will appreciate, suitable values for the scale factor A and the threshold Th can be determined empirically in advance using recordings of extended periodic signals and environmental noise.

Therefore, as those skilled in the art will appreciate, each time a new periodicity measure for the next speech frame is input into the buffer 109, the extended periodicity determining unit 111 determines whether or not the speech in the new detection window corresponds to an extended periodic signal. However, if the peak value of Am+s happens to be close to the threshold value, then several detections may be triggered in a short time. In order to avoid this problem, the decision unit 1119 does not output a new decision indicating an extended periodic portion for one second after the previous such decision was made.

SUMMARY AND ADVANTAGES

As those skilled in the art will appreciate, a system has been described above which allows the user to take remote photographs using only their voice. Rather than use an automatic speech recognition system within the camera, the camera includes a speech processing system which is arranged to detect a sustained periodic signal within the user's speech and, when detected, causes the camera to take the photograph. The system therefore has the following advantages over existing camera systems:

(1) the camera shutter is able to be operated when the user is ready for the photograph to be taken in contrast to a timer system where the user must wait for the timer.

(2) The camera shutter can be operated any number of times in contrast to a timer system where the user must reset the timer for each photograph.

(3) The camera shutter can be operated without the need for an additional remote control device that is inconvenient and adds to the cost of the camera.

(4) Periodic signals can be detected even when contaminated with high levels of noise. This is important because the user might be several meters from the microphone of the camera and the signal-to-noise ratio may therefore be small. Current automatic speech recognition systems perform poorly at such low levels of signal-to-noise ratio.

(5) The system does not require localisation for each language since the user can be instructed to utter any word that contains a sustained vowel sound. In contrast, existing automatic speech recognition techniques would require speech data to be collected for each language and would significantly increase the cost of the camera.

(6) The processing of the acoustic signal is relatively simple and does not therefore have very high computational and memory resource requirements compared with those of a full automatic speech recognition system.

Alternatives and Modifications

An embodiment has been described above of a voice-activated camera which allows a user to take remote photographs by speaking a keyword. A technique has been described for detecting the keyword by detecting extended periodic sounds uttered by the user. As those skilled in the art will appreciate, the particular keyword detection algorithm described above can be used to control other devices as well as cameras.

In the above embodiments, the speech processing unit was arranged to divide the speech signal into a number of successive frames and to calculate a measure of the periodicity of the speech within each frame. This periodicity measure was deter-mined by performing an auto-correlation of the speech signal within the frame. As those skilled in the art will appreciate, because of the equivalent relationship between correlation in the time domain and multiplication in the frequency domain, a similar periodicity measure can be determined by taking the Fourier transform of the speech samples within each frame, squaring the transform and then looking for the periodic peaks within the squared transform. The way in which such an alternative embodiment would operate will be apparent to those skilled in the art and will not be described further.

In the above embodiment, a filter was used after the analogue-to-digital converter in order to remove higher frequency speech components to thereby improve the signal-to-noise ratio. In an alternative embodiment, the bandpass filter may be replaced with a Weiner filter which is tuned to the spectral shape of an extended vowel sound. Such a filter will therefore improve the signal-to-noise ratio for such extended vowel sounds, making the algorithm more sensitive to extended vowels and less sensitive to other sounds. The way in which such Weiner filters work will be apparent to those skilled in the art in signal processing and will not, therefore, be described further.

In the above embodiment, the speech processing unit can detect periodic signals having a fundamental frequency greater than 300 Hertz. In order to mitigate this problem, the speech processing unit may also include a pitch detection circuit which processes the speech signal in order to estimate the pitch of the user's signal. The speech processing unit can then use this estimated pitch to reject sounds outside of the 100 to 300 Hz range. Additionally, if such a pitch detector is provided, then the extended periodicity determining unit may also check to ensure that the estimated pitch also does not change greatly during the current detection window (corresponding to the current set of periodicity measures within the buffer). This may help to reject musical sounds which also include periodic components but whose fundamental frequency changes over time.

Figure 8:
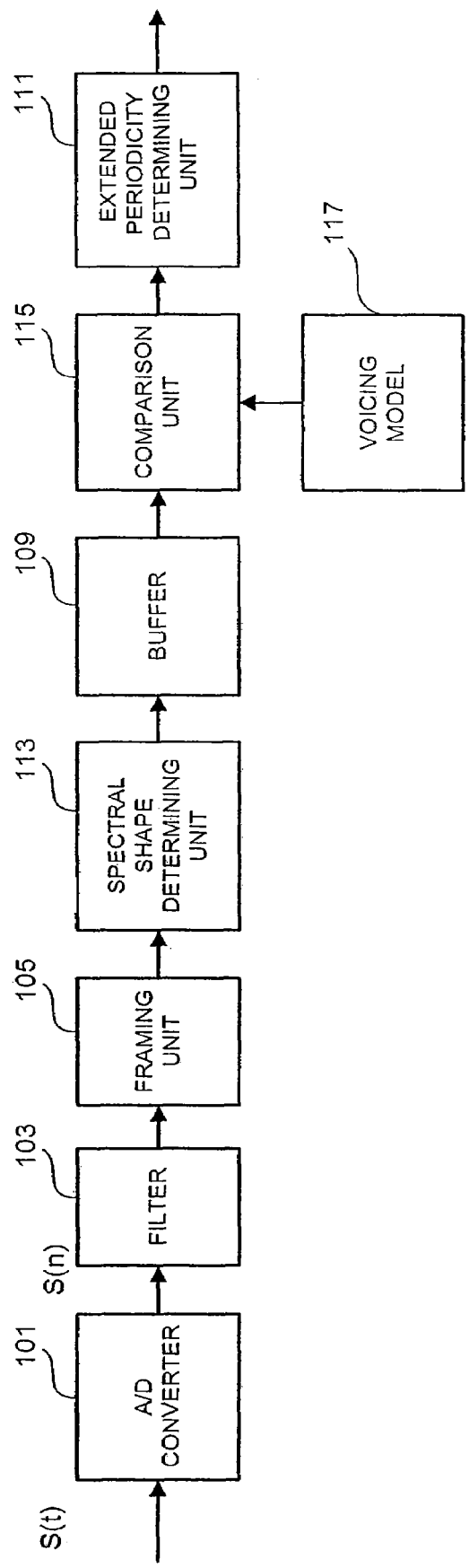
FIG. 8 is a schematic block diagram illustrating the main components of an alternative speech processing unit to the one shown in FIG. 2.

In the above embodiments, the speech processing unit did not use any spectral shape information to detect the extended vowel sound uttered by the user. FIG. 8 illustrates an embodiment where the speech detection unit uses such spectral shape information to detect the extended vowel sound. The same reference numbers have been given to components that have equivalent functionality as in the first embodiment and these will not be described again. As shown, in this embodiment, the speech processing unit includes a spectral shape determining unit 113 which processes the speech samples within each frame to determine a vector representing the spectral shape of the speech within the frame. Any standard spectral representation may be used such as the cepstral or LPC spectral representations.

The spectral parameters for the current frame generated by the spectral shape determining unit 113 are then input to the first-in-first-out buffer 109. The sets of spectral parameters stored in the buffer 109 are then compared by the comparison unit 115 with a spectral voicing model 117 for a vowel sound. The result of the comparison is then processed by the extended periodicity determining unit 111, again to determine if an extended periodic sound is present within the input speech. Further, the extended periodicity determining unit may be arranged to control the detection by checking that the spectral shape parameters for the frames in the buffer 109 do not change by more than predetermined amount.

In the embodiment described above, a periodicity measure was calculated for each frame of speech using an auto-correlation calculation. As those skilled in the art will appreciate, other periodicity measures can be used. For example, the Average Magnitude Difference (AMDF) method could be used which calculates the following function:

$$\frac{1}{N}\sum_{0}^{n}|x_j - x_{j-n}| \qquad (6)$$

As those skilled in the art will appreciate, this function is faster than auto-correlation to implement in integer arithmetic since it does not involve any multiplication.

In the embodiment described above, the extended periodicity measure determining unit calculated two measures that represented the variation of the periodicity measures within the detection window (i.e. for the frames within the buffer). As those skilled in the art will appreciate, it is not essential to use both of these variation measures. Further, it is not essential to use the particular variation measures that are calculated. For example, the variation measures given in equations (3) and (4) may be modified to replace the absolute operations with a square operation. Further, in an alternative embodiment only one of the variation measures may be used. Additionally, where more than one variation measure is used, it is not essential to combine these in a linear manner. Instead, the variation measures may be combined in a non-linear way by, for example, a neural network.

In the embodiment described above, the frame periodicity determining unit calculated an auto-correlation function for the speech samples within each frame in the current detection window. However, since the peak determining unit searches for a peak within the auto-correlation function between $A(L_{low})$ and $A(L_{high})$ it is only necessary for the auto-correlation determining unit to calculate the auto-correlation function between these values and to calculate $A(0)$.

In the embodiment described above, the frame periodicity determining unit determined a measure of the periodicity of the speech within each frame by using an auto-correlation calculation. Alternatively, the camera may be pre-trained by the user and may store a frame of speech corresponding to a voiced portion uttered by the user. In this case, the frame periodicity determining unit may perform a cross correlation between each frame in the received speech and the stored frame from the training speech. Although such an embodiment requires a user training routine, it offers the advantage that the camera will only detect periodic signals whose fundamental frequency matches the pitch of the training speech. The system will therefore be more robust to similar periodic signals coming from different users or from different sources.

In the above embodiment, the periodicity measures for the frames in the current detection window were combined and then the combined measure was compared with a predetermined threshold. Alternatively, each periodicity measure may be compared with the threshold and a running score kept of the number of periodicity measures in the current detection window which are greater than or less than the threshold value. The extended periodicity determining unit can then determine if there is an extended periodic speech signal from this running total.

In the above embodiment, a camera has been described having a number of processing modules. As those skilled in the art will appreciate, these processing modules may be implemented by dedicated hardware circuits or they may be implemented using a general purpose processor controlled by software instructions. The software instructions may be programmed in advance into the camera or they may be purchased later and, for example, downloaded from a website into the camera.

In the embodiment described above, the extended periodicity determining unit processed the periodicity measures stored in the buffer to detect a sustained voiced signal with a minimum duration of one second. As those skilled in the art will appreciate, the minimum duration does not have to be one second to detect a sustained voiced signal. However, if the minimum duration is too short, then this may result in too many detections and if the minimum duration is too long, then this may be inconvenient for the user. In a preferred embodiment, therefore, the minimum duration is preferably set between half a second and one and a half seconds.

The invention claimed is:

1. An apparatus for controlling a device, the apparatus comprising:
   a receiver operable to receive a speech signal;
   a divider operable to divide the speech signal into a sequence of speech frames, each speech frame representing a time portion of the speech signal;

a processor operable to determine an auto-correlation function for each speech frame;

a peak determiner operable to locate a maximum auto-correlation value within a predetermined part of said auto-correlation function for each speech frame;

a periodicity measurer operable to determine a periodicity measure of each speech frame by using the maximum auto-correlation value of each speech frame;

a variability measurer operable to determine, from periodicity measures of a plurality of consecutive speech frames, a plurality of variability measures by using different calculation methods;

a detector operable to combine the plurality of variability measures and to detect an extended periodic portion from the combined variability measures; and a controller operable to control said device in dependence upon a detection made by said detector.

2. An apparatus according to claim 1, wherein said detector is operable to linearly combine said plurality of variability measures.

3. An apparatus according to claim 1, wherein said detector is operable to combine said plurality of variability measures in a non-linear manner.

4. An apparatus according to claim 1, wherein said detector is operable to compare the combined periodicity measures with a threshold value.

5. An apparatus according to claim 1, wherein said predetermined part corresponds to an input frequency of the speech signal in the range of 100 Hertz to 300 Hertz.

6. An apparatus according to claim 1, wherein said processor is operable to calculate:

$$v_i = \frac{A_i(L_{MAX})}{A_i(0)}$$

where $A(0)$ is the value of the auto-correlation function for a zero shift and $A(L_{max})$ is said maximum auto-correlation value determined by said peak determiner.

7. An apparatus according to claim 1, further comprising an analogue to digital convener operable to sample the received speech signal.

8. An apparatus according to claim 7, wherein said divider is operable to divide said speech signal so that each frame comprises the same number of samples.

9. An apparatus according to claim 1, further comprising a microphone, wherein said receiver is operable to receive the speech signal from said microphone.

10. An apparatus according to claim 1, wherein said device is an image capture device and wherein said controller is operable to activate the image capture device to capture an image.

11. An apparatus according to claim 1, wherein said detector is operable to process the periodicity measures from successive speech frames corresponding to a predetermined duration of speech.

12. An apparatus according to claim 11, wherein said detector is operable to process the periodicity measures from successive speech frames corresponding to a portion of speech having a duration between half a second and one and a half seconds.

13. A computer readable medium storing computer executable instructions for causing a computer to perform a controlling method for a device, the computer executable instructions comprising instructions for:

receiving a speech signal;

dividing the speech signal into a sequence of speech frames, each speech frame representing a time portion of the speech signal;

processing each speech frame to determine an auto-correlation function for each speech frame;

locating a maximum auto-correlation value within a predetermined part of the auto-correlation function for each speech frame;

determining a periodicity measure of each speech frame by using the maximum auto-correlation value of each speech frame;

determining, from periodicity measures of a plurality of consecutive speech frames, a plurality of variability measures by using different calculation methods;

combining the plurality of variability measures;

detecting an extended periodic portion from the combined variability measures and outputting a detection; and controlling the device in accordance with the detection.

14. Computer executable instructions for controlling a computer to perform a controlling method for a device, the computer executable instructions comprising instructions for:

receiving a speech signal;

dividing the speech signal into a sequence of speech frames, each speech frame representing a time portion of the speech signal;

processing each speech frame to determine an auto-collation function for each speech frame;

locating a maximum auto-collation value within a predetermined part of the auto-correlation function for each speech frame;

determining a periodicity measure of each speech frame by using the maximum auto-correlation value of each speech frame;

determining, from periodicity measures of a plurality of consecutive speech frames, a plurality of variability measures by using different calculation methods;

combining the plurality of variability measures;

detecting an extended periodic portion from the combined variability measures and outputting a detection; and controlling the device in dependence upon the detection.

15. An apparatus for controlling a device, the apparatus comprising:

means for receiving a speech signal;

means for dividing the speech signal into a sequence of speech frames, each speech frame representing a time portion of the speech signal;

means for determining an auto-correlation function for each speech frame;

means for locating a maximum auto-correlation value within a predetermined part of the auto-correlation function for each speech frame;

means for determining a periodicity measure of each speech frame by using the maximum auto-correlation value of each speech frame;

means for determining, from periodicity measures of a plurality of consecutive speech frames, a plurality of variability measures by using different calculation methods;

means for combining the plurality of variability measures;

means for detecting an extended periodic portion from the combined variability measures; and means for controlling the device in accordance with a detection made by said means for detecting.

* * * * *